May 7, 1974  H. FEDDERN  3,809,564
METHOD TO CONTROL THE MOISTURE CONTENT OF GRANULAR SUBSTANCES
Filed Dec. 14, 1971  3 Sheets-Sheet 1

United States Patent Office 3,809,564
Patented May 7, 1974

3,809,564
METHOD TO CONTROL THE MOISTURE CONTENT OF GRANULAR SUBSTANCES
Horst Feddern, Schaffhausen, Switzerland, assignor to Georg Fischer Aktiengesellschaft, Schaffhausen, Switzerland
Filed Dec. 14, 1971, Ser. No. 207,775
Claims priority, application Switzerland, Dec. 16, 1970, 18,683/70
Int. Cl. B28b 7/34
U.S. Cl. 106—38.9                 5 Claims

ABSTRACT OF THE DISCLOSURE

A feeler is introduced into the granular substance which is relatively moved with respect to the feeler with a predetermined force. The feeler can move over a deflection path against a restraining force, for example, a spring, and the extent of deflection of the feeler from a rest position is measured, this extent being a measure of the stickiness, or moisture content of the granular substance. Addition of moisture is controlled by the extent of this deflection.

CROSS REFERENCE TO RELATED APPLICATION

U.S. application Ser. No. 203,514, filed Dec. 1, 1971, now Pat. No. 3,724,821.

The present invention relates to a method, and to an apparatus to carry out the method to control the extent of moistening, or wetting of granular material, particularly of foundry or molding sand, the granular substance having a liquid binder added thereto, such as water, in dependence on sensed consistency of the moistened granular material.

Devices to regulate the moisture content of granular materials are known. Such devices are used, for example, in connection with foundry molding sand. The material, such as sand, is carried over a sieve and the extent of passage of material through the mesh of the sieve can be utilized to control the moisture thereof, for example, by adding additional wetting material. The granular material can be carried over a plate having at least one opening of predetermined size. The relative proportion of the quantity of material passing through the opening with respect to that which goes over or passes over the opening will be a measure of the moistening content. The basis for such an apparatus is the assumption that dry sand can fall through one or more slits or meshes of a sieve, whereas, sand having an increasing moisture content becomes more sticky and will no longer pass through the slits or meshes. After the relative proportion of sand falling through the slits or meshes has been determined, additional water can be added depending on such determination.

Arrangements such as those proposed have the disadvantage that if a relatively small slit is used, or, if the mesh of a sieve is comparatively small, foundry sand which usually is somewhat sticky will collect at the edges of the slits or meshes, and thus change the actual size of the slit or the mesh. Additionally, the shearing, or scissor-like effect, with slits in plates have on material gliding thereover, will tend to distort measured results. Thus it is necessary in actual practice to heat the slitted plate, in order to prevent collection of sand at the measuring slits. This heating additionally interferes with proper measuring and influences the measured results. Such an arrangement is, additionally, comparatively expensive.

It is an object of the present invention to provide a method and an apparatus to control the moistening of granular material, and more particularly the moistening of molding or foundry sand, in which the disadvantages of apparatus of the prior art are effectively avoided.

SUBJECT MATTER OF THE PRESENT INVENTION

Briefly, a feeler dips into the granular material, the feeler being movable against a predetermined force, varying between a minimum and a maximum. The feeler and the material are subject to relative movement. The feeler will be deflected, against the counter force, from a rest position, more, or less, depending on the moisture content of the material to be measured. Depending on the deflection, a measuring valve adding more or less liquid to the granular material, that is, adding water in case of foundry sand, has its opening controlled by the deflection of the feeler.

Apparatus to carry out this concept includes a feeler which is restrained by a predetermined spring force, but capable of being deflected against the spring, the extent of deflection directly, or indirectly controlling the opening of a valve adding moistening, or wetting agent.

The invention will be described by way of example with reference to the accompanying drawings, wherein.

Figure 1:
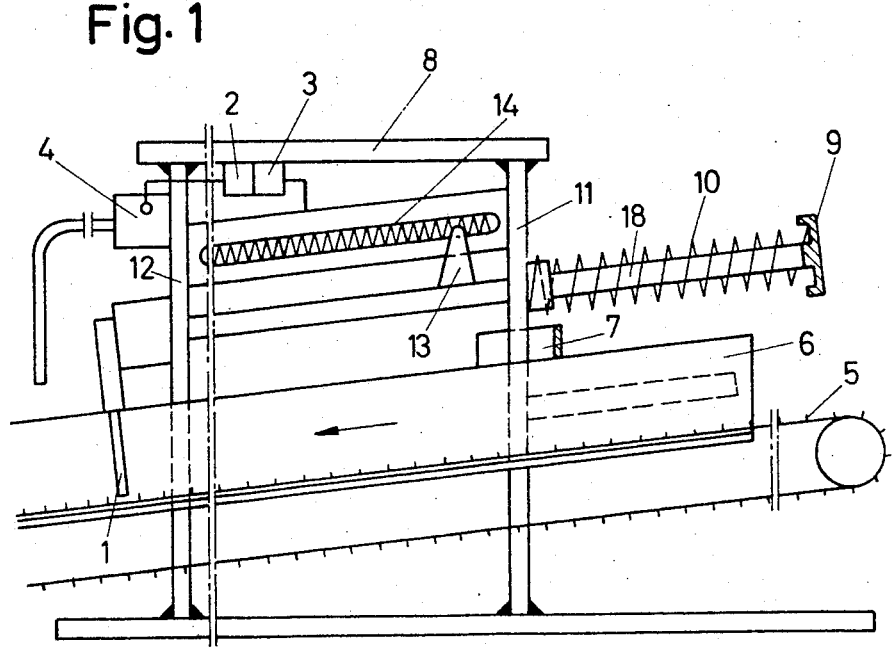
FIG. 1 is a side view of an embodiment of the invention, utilizing an electrically operated control, and also useful to explain the method.

FIG. 1 shows a transport arrangement for granular material, such as a conveyor belt 5 on which granular material is transported, in the direction of the arrow, the material being constrained between a pair of side walls 6. The upper limit of the material is determined by a skimming blade 7, limiting the upper extent of the material on belt 5, for example, to the height of the side walls 6. A feeler 1 dips into the granular material being transported on the belt 5. The feeler is secured to a rod 18 which can be moved in the direction parallel to that of the belt 5, by being guided in a frame 8. The remote end of rod 18 has a disc 9 secured thereto. A helical compression spring 10 surrounds rod 18 and bears on the one hand against disc 9, and on the other against the right support 11 of frame 8. A slider 13 extends upwardly from rod 18 and slides on an electrical control resistance 14, mounted between the post 11 and the forward post 12 of frame 8. The control resistance 14 is connected to an amplifier 3, which is in turn connected to a measuring bridge 2, the output of which is utilized to control the opening of an electromagnetic measuring valve 4, adding further binder material to the granular substances carried on belt 5, to bring the wetting content, or moisture content of the material on the belt 5 to a desired consistency.

In accordance with the method of the invention, the rigid feeler 1, fixed to the rod 18 is movable against the force of the spring 10, the spring force being determined between limits P-min. and P-max., that is, between minimum and maximum limits. The feeler, dipping into the granular material, is deflected by the predetermined uniform motion of the loose, granular material on the conveyor belt 5, the deflection depending upon the relative looseness, or stickiness of the material on belt 5. The slider, tapping off at more or less deflected positions from the resistance 14, provides varying potentials to amplifier 3 and hence to measuring bridge 2, to control complete closing, or opening, or intermediate positions between closing and opening of the valve 4. If the material to be wetted is foundry sand, or molding sand, the material to be added from valve 4 is, usually, water.

The deflection of the feeler, during measuring of the wetting will be determined both by the quantity of the granular material impinging against the feeler, as well as by the relative degree of stickiness, or looseness of the granular material, for example sand. In some applications it is desirable to always have the same quantity of material impinge on the feeler 1. To this end, the skimming or stripping element 7, as seen in FIG. 1, is particularly desirable, since the feeler will then be subjected to a predetermined depth of penetration within the material and, for each unit of time, will be deflected by a uniform quantity of granular material.

Figure 2:
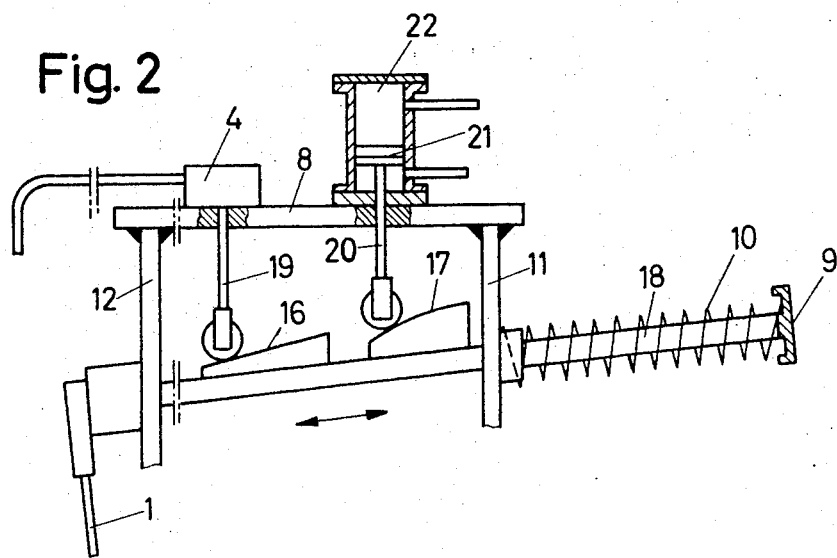
FIG. 2 is a side view of a mechanically operating moistening control apparatus.

The feeler deflection, as illustrated in FIG. 1, can be utilized as an independent control quantity, which indirectly controls (for example electrically) the amount of moisture to be added. FIG. 2 illustrates a mechanical control arrangement; those parts of the apparatus which are similar to those of FIG. 1 and which are not necessary to an understanding have not been shown again, and others have been given the same reference numerals and need not be described again in detail. Rod 18 has a pair of cam or setting curves 16, 17 secured thereto. These cams are inclined with respect to the inclination of rod 18 and engage cam followers 19, 20. Cam follower 19 directly controls valve 4', now a mechanically controlled valve, which applies moisture, such as water, to the granular material as in the embodiment of FIG. 1. The cam follower 20 is secured to the piston 21 of a hydraulic cylinder 22 which, in turn, is connected to a hydraulically operated supply device for slurry, or the like, to control the application of material to the transport belt 5. Thus, little or no deflection can indicate not only that the material is very sticky, but also that only little material is present and more should be added.

Various types of control arrangements may be used, and the method and system are not limited to the examples shown and described. It is irrelevant, for purposes of the invention, whether the granular material is moved, or whether the feeler is moved, so long as relative movement between feeler and granular material obtains. The path of movement is also irrelevant—it may be rectilinear (as shown in FIGS. 1 and 2) or circular or otherwise.

Figure 3:
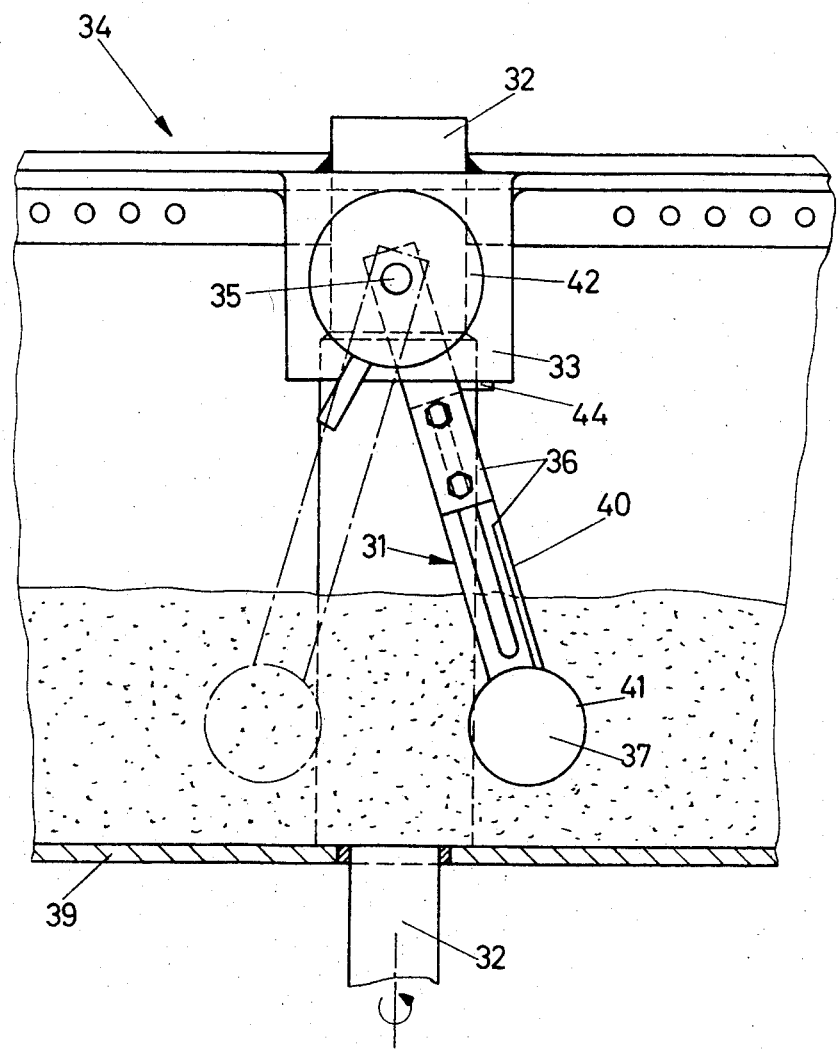
FIG. 3 is a fragmentary front view of a controller, and a specific type of feeler.
Figure 4:
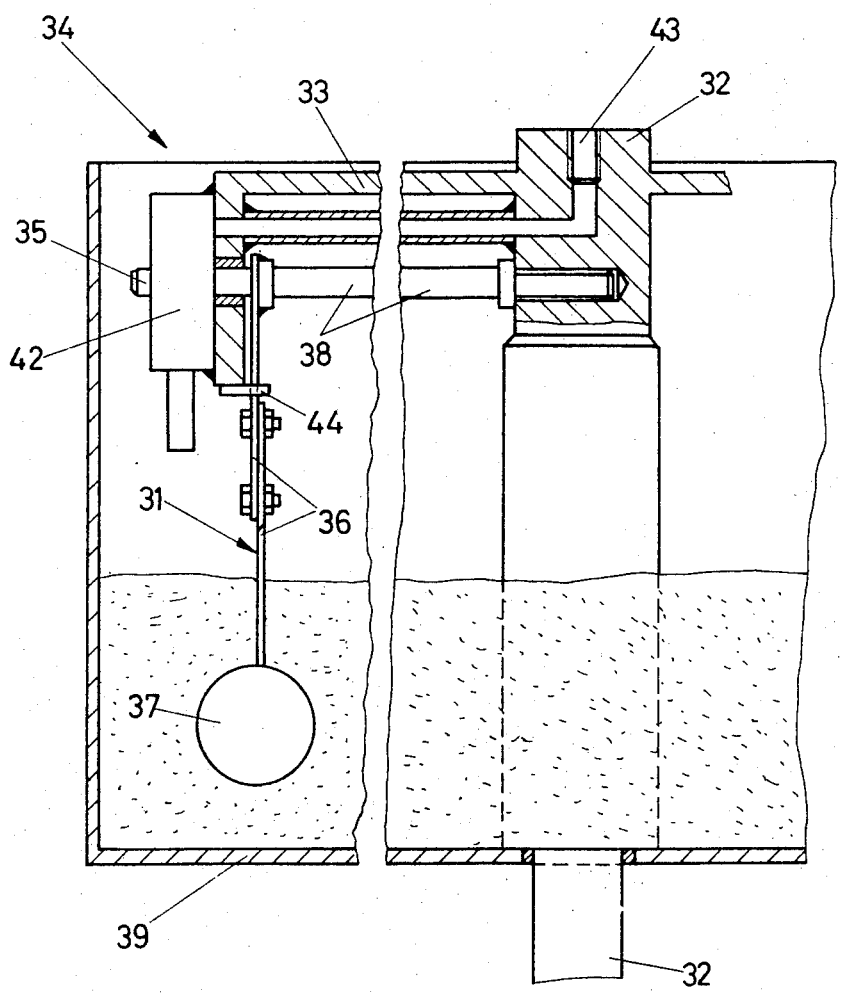
FIG. 4 is a side view of the arrangement of FIG. 3.

The foregoing apparatus utilizes, generally, a skimming or doctor blade 7 in order to provide uniform depth of insertion of the feeler into the granular material, that is, to provide the same area on the feeler against which the material can impinge, and thus cause deflection. In the embodiments of FIGS. 3 and 4, the feeler is formed in a specific manner and specific depth of material is not required for appropriate control.

Feeler 31 is connected to an arm 33 which, in turn, is connected to a rotating shaft 32 of a mixer 34, and swingable about a shaft 35. Feeler 31 includes a holder 36, of adjustable length, and a resistance element 37. The portion of the holder 36 which dips into the granular material has a portion, transverse to the movable direction of the granular material, which is shaped to be streamlined. Thus, the attack surface 40 is so arranged that it is of minimal size, consistent with requisite strength. It should provide a comparatively small resistance to the material within the mixing vessel 39 of the mixer. The resistance element 37, itself, has a larger surface subject to be engaged by the material. This resistance body is preferably spherical, the holder 36, with its attack surface 40 providing a resistance which is practically negligible regarding the control function of the degree of moistening. The adjustment for length of holder 36 is provided in order to be able to adjust the depth of dipping of the feeler 31, that is, of essentially the resistance element or sphere 37, into the granular material in vessel 39 by a substantially constant amount. This provides for ease of regulation. The feeler should not dip into the granular material too deeply since, otherwise, the operation thereof may be impaired.

Holder 36 of the resistance body, or element 37 is connected securely to a torsion spring. The holder is rotatably held at the outer end of the arm 33, secured to the drive shaft 32. The outer end of the torsion spring, or, an element (such as shaft 35) transferring deflection of the arm 36 is connected to a measuring valve 42, such that the degree of rotation permitted by the torsion spring 38 controls the opening of valve 42, more or less. Valve 42 is connected to a supply line 43 through which liquid moistening material, for example water, or slurry, can be added. The valve 42 permits additional liquid material to be introduced into the granular material, such as foundry sand. Arm 33 is formed with a stop 44, against which feeler 31 can abut in its base, or rest position.

When the shaft rotates, driven, for example, by a motor (not shown), a force will act on resistance body 37 which depends on the consistency of the material in vessel 39 and impinging on the resistance body 37. The force acting on the resistance body 37 will, then, depend on the respective consistency of the granular material and permit, depending on this consistency, a deflection of feeler 31 counter the force of torsion spring 38 which is fixed against torsion in the central shaft of the vessel. The position of the arm and body 37 will change, for example to the position indicated in chain-dotted lines in FIG. 3, causing a corresponding addition of moisture or slurry from valve 42.

Various embodiments of the control device are possible. For example, the deflection element can control different ones of control arrangements for foundry sand, applied to a mixer, if this is desired. The arrangement in accordance with FIGS. 3 and 4 has the advantage that a doctor blade, or skimmer need not be provided. This is a simplification of the structure over that of FIGS. 1 and 2, requiring, merely, an adjustable feeler, in which the length of penetration of the feeler into the granular material can be varied.

The granular material can thus be tested for moistening content and consistency, that is, relative looseness or stickiness, and have, directly, added additional moistening substance such as water, depending on the consistency being sensed.

Various changes and modifications may be made within the inventive concept.

I claim:

1. Method of controlling the moisture or wetting content of granular substances comprising the steps of
   introducing a mechanically deflectable feeler into the granular substance;
   relatively moving the granular substance and the feeler;
   restraining the movement of the feeler upon such relative movement of the deflectable feeler and the substance by a force varying between maximum and minimum limits;
   measuring the mechanical deflection counter the restraining force of the feeler upon such relative movement of the substance and the feeler as a measure of the stickiness, and hence moisture or wetting content of the granular substance;
   and controlling the amount of liquid to be added to the substance in dependence on said measured deflection.

2. Method according to claim 1, wherein the feeler is introduced into the substance by a predetermined distance.

3. Method according to claim 1, wherein the step of controlling the amount of moisture to be added comprises the step of controlling the addition of liquid to the substance between predetermined limits in accordance with deflection of said feeler against said restraining force.

4. Method according to claim 1, wherein the feeler is rigid and movably mounted; and the step of measuring the deflection of the feeler comprises resiliently restraining deflection of the feeler by a variable force, which varies between minimum and maximum limits.

5. Method according to claim 1, wherein the granular substance is foundry sand, and the liquid added is water.

References Cited

UNITED STATES PATENTS 3,141,129  7/1964  Dietert _____ 73—73

FOREIGN PATENTS

| | | | |
|---|---|---|---|
| 180,269 | 8/1962 | Sweden | 106—38.9 |
| 593,563 | 10/1947 | Great Britain | 106—38.9 |
| 600,210 | 4/1948 | Great Britain | 106—38.9 |
| 621,181 | 4/1949 | Great Britain | 106—38.9 |
| 1,246,284 | 8/1967 | Germany | 73—73 |

LORENZO B. HAYES, Primary Examiner

U.S. Cl. X.R.

73—73; 164—4